March 10, 1970   H. J. SCHELLSTEDE ET AL   3,499,210
METHOD OF MOUNTING A PROTECTOR ON A DRILL PIPE
Filed June 13, 1967   2 Sheets-Sheet 1
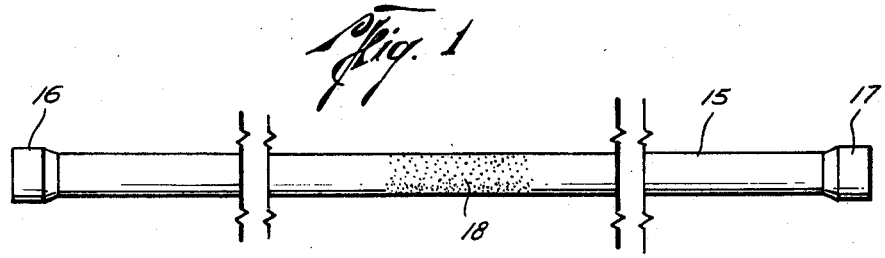
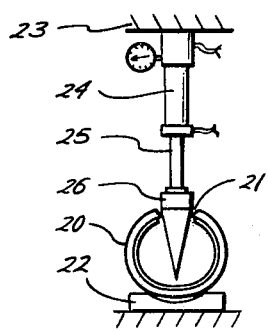
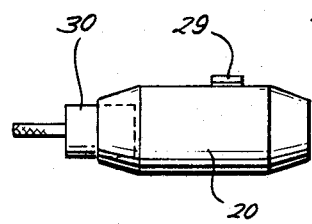
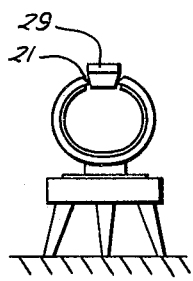
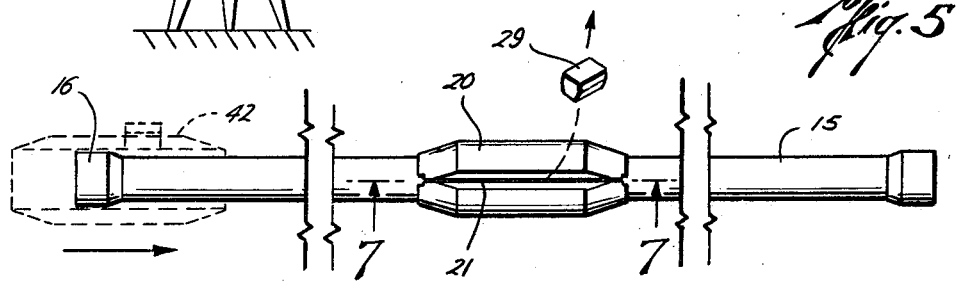
Herman J. Schellstede
Thomas M. Sanders
INVENTORS
BY *Bertram A. Mann*
ATTORNEY

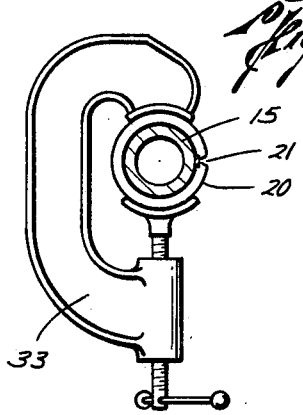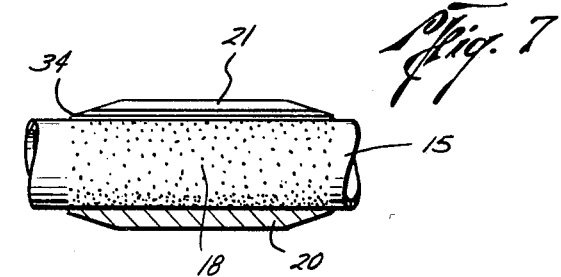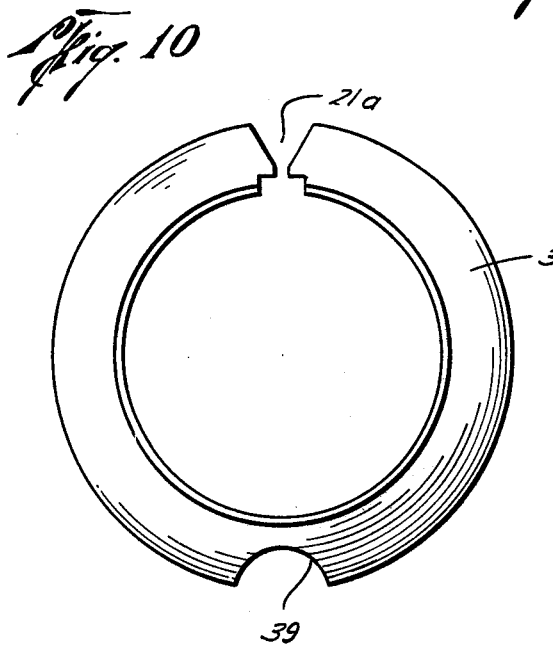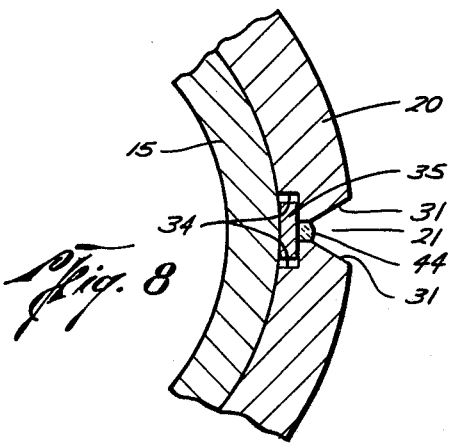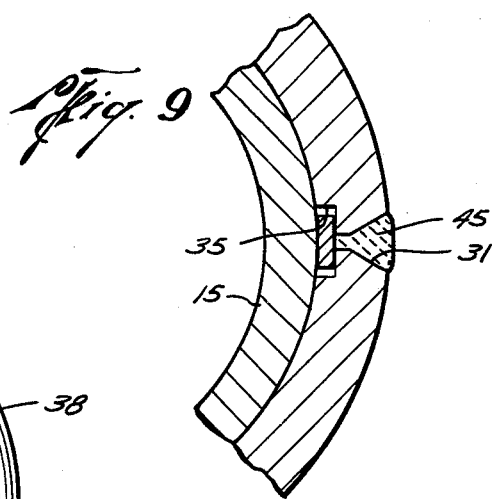

United States Patent Office 3,499,210
Patented Mar. 10, 1970

3,499,210
METHOD OF MOUNTING A PROTECTOR ON A DRILL PIPE
Herman J. Schellstede, Houma, and Thomas M. Sanders, New Iberia, La., assignors to Sparta Industries, Inc., Houma, La., a corporation of Louisiana
Filed June 13, 1967, Ser. No. 645,739
Int. Cl. B23p *11/02;* B23k *31/02*
U.S. Cl. 29—447                                          6 Claims

ABSTRACT OF THE DISCLOSURE

A longitudinally split sleeve is opened, as by wedging means, to permit application thereof longitudinally over an upset end of a drill pipe section. The sleeve, preheated, is released adjacent a cleaned area of the pipe surface to snugly grip this area. A back-up strip and a stringer bead of weld metal are then inserted at the bottom of the split to complete the envelopment of the pipe so that the sleeve, upon cooling, will assume a very firm shrink fit upon the pipe. Filling of the split with weld metal is completed by conventional methods during cooling of the sleeve body.

BACKGROUND OF THE INVENTION

Field of the invention

This invention relates to protector devices and methods of applying them to drill pipe for reinforcing the pipe against abrasions and blows due to contact with the bore wall.

Prior art

Considerable difficulty has been experienced in applying protectors to drill pipe with sufficient firmness to prevent the protector from being slid along the pipe or even broken off during normal use so as to fall into the hole. For instance, rubber or other resilient inserts sometimes provided between the pipe and the protector sleeve will not stand up under the heavy blows, high temperatures, and other damaging treatment to which drill pipe and protectors are subjected. Moreover, protector sleeves made of two or more segments welded or otherwise secured about the pipe are subject to falling from the pipe, due, for instance, to erosion or breakage. Means have not previously been provided for applying a one-piece protector sleeve or collar over the upset end of a drill pipe and mounting the same on the pipe with sufficient tightness to resist all normal forces tending to slide the member along the pipe or to break it off.

SUMMARY OF THE INVENTION

In accordance with the present invention, a metal sleeve having a single longitudinal split is circumferentially expanded, as by the radial insertion of a wedge into the split, is heated to approximately 650° F., and then slid endwise over the upset end of a pipe section. The surface of the pipe on which the protector is to be mounted is previously cleaned as by sandblasting. When the protector is abreast this cleaned pipe surface, the wedging plug or block is removed from the split. If necessary, the sleeve is then contracted by a hydraulic clamp device so as to snugly engage the pipe surface. Next, a welding back-up strip is inserted at the bottom of the split in lateral grooves provided therefor. A so-called stringer or base bead of weld metal is then applied at the bottom of the groove so as to cause the sleeve to solidly ring the pipe in snug engagement therewith. Thereupon, the application of weld metal to the split is completed and, at the same time, the sleeve cools so as to be brought into a very firm shrink fit upon the pipe. Threaded tool joint couplings are the applied to the ends of the pipe section.

BRIEF DESCRIPTION OF THE DRAWINGS

In the accompanying drawings which illustrate the invention,

FIG. 1 is an elevation of a section of drill pipe with an intermediate surface cleaned preparatory to mounting the novel protector sleeve thereon.

FIG. 2 diagrammatically represents the method of circumferentially expanding the split sleeve prior to slipping the same on the drill pipe.

FIG. 3 is a side view of the protector collar prepared for slipping endwise onto the drill pipe.

FIG. 4 is an end view of the structure in FIG. 3.

FIG. 5 shows the split collar mounted on the drill pipe.

FIG. 6 shows the split collar being mechanically compressed about the drill pipe.

FIG. 7 is an enlarged vertical longitudinal section through a portion of the structure of FIG. 5.

FIG. 8 is an enlarged detail cross section through the protector sleeve mounted on a drill pipe and showing succeeding steps in securing the same thereto.

FIG. 9 is a view similar to FIG. 8 but showing the completed weld.

FIG. 10 is an end view of a modified form of protector sleeve.

DESCRIPTION OF THE PREFERRED EMBODIMENTS

In FIG. 1 there is shown a section 15 of drill pipe having upsets 16 and 17 at its opposite ends forming thickened wall portions to which pin and box tool joints are to be secured The upsets 16 and 17 are somewhat exaggerated, these being typically of 4¾" nominal O.D. in drill pipe of 4½" O.D. The tool joint to be welded to the upsets (not shown) are conventionally of approximately 6" O.D.

At the middle of the pipe section, or at any desired location therealong, the surface of the pipe is cleaned, as illustrated at 18, for instance, by sandblasting.

FIG. 2 is an end view of a sleeve 20 having a single longitudinal split 21 and supported on the lower rest 22 of a clamping jig. Interposed between sleeve 20 and the upper head 23 of the jig is the hydraulic cylinder 24 in which a piston (not shown) operates. Piston rod 25 projecting from the piston carries a wedge 26 at its lower extremity which is shown inserted in split 21 and expanding the same, as will be explained.

In FIGS. 3 and 4, a small block 29 is shown inserted in split 21 for holding the sleeve in its expanded position, and a plug gauge 30 is inserted in one end of the sleeve to make certain the sleeve is opened sufficiently.

FIG. 5 shows block 29 removed from split 21, to allow the sleeve to clamp about pipe 15. The sidewalls of split 21 have been previously chamfered, as better shown at 31 in FIG. 8.

FIG. 6 is a transverse section through the pipe, with sleeve mounted thereon, as in FIG. 5, and showing a clamping device 33 for further contracting the sleeve about pipe 15. As better shown in FIG. 8, the walls of longitudinal split 21, beneath chamfered portions 31, are laterally slotted, as at 34, for reception of a back-up strip 35.

According to the modification in FIG. 10, sleeve 38 is constructed the same as in the previous form, except for the addition of a longitudinal groove 39, here of semicircular section, for a purpose to be described.

The method of applying the novel protector sleeve to a drill pipe 15 is as follows: After the sleeve has been expanded, as by the wedging means illustrated in FIG. 2, and blocked open, as in FIG. 3, the sleeve is heated to approximately 650° F. for circumferentially expanding the same. The needed expansion is determined by plug gauge 30, as in FIG. 3. The heated sleeve is then slipped ndwise over one upset end 16 of the pipe section 15, s illustrated in dotted line at 42 in FIG. 5, before the pplication of a tool joint coupling thereto. When the eated and circumferentially opened sleeve is abreast of leaned portion 18 of the pipe surface, block 29 is removed, as suggested in FIG. 5, permitting the sleeve to lose about the pipe surface. If necessary, the sleeve is urther contracted, as by means of a mechanical clamp, s suggested in FIG. 6, to cause snug engagement of the leeve with the pipe surface.

Next, the back-up strip 35 is slid endwise along the pipe urface and into lateral slots 34. Then, quickly, a base r stringer bead 44 is laid at the bottom of chamfered ongitudinal split 21. We have formed this root bead ising a stainless steel No. 312 electrode, ⅛-inch in diameter. Upon completion of this stringer bead, the sleeve s circumferentially complete about the pipe so that cooling thereof will draw the sleeve into a very firm shrink fit ipon the pipe. During this cooling, the balance of the veld is completed by conventional methods, as by cleaning root pass 44, then making additional passes using ⅛" A.P.S. electrode and submerged arc flux until the /-groove formed by split chamfers 31 is completed, as at 15 in FIG. 9.

Tests have shown that a split sleeve of 4½" internal diameter, 6¼" external diameter, a length approximately hree times the nominal O.D. of the drill pipe, and of ;ood ductile steel and installed according to the present nvention, will resist sliding along the pipe under a test hear load as high as 450,000 pounds. When it is desirable o calculate the hoop stress caused by cooling of the leeve, this can be achieved by grinding a longitudinl ;roove in the sleeve until the remaining metal fails. Then he area of the fracture is multiplied by the unit tensile trength of the steel to obtain the total hoop load.

A mild steel has a coefficient of thermal contraction of $5.7 \times 10^{-6}$ inch per inch per degree F., while weld material has a coefficient of thermal contraction of $9.2 \times 10^{-6}$ nch per inch per degree F. Nevertheless, the circumerence of the split sleeve is approximately 15 times the vidth of the weld material. Accordingly, it is obvious hat the major hoop stresses are caused by contraction of he sleeve itself rather than the weld material. It has been letermined that, under the conditions mentioned, the split leeve should be heated in the range of 650° F. to proide the desired hoop stresses for resisting maximum detructive forces anticipated.

Due to the novel one-piece construction of the proector sleeve, it cannot be broken free of its mounting ipe section under anticipated forces until its wall is /ery materially worn. Thus, the sleeve, in addition to being eminently durable, is practically free of the possiility of breakage from the pipe, as has been experienced where protectors assembled of two or more segments have been used.

The modification in FIG. 10 facilitates the expansion of the sleeve for sliding over the thickened end of a drill pipe section, by removing a small section of metal, as at 39, opposite longitudinal split 21a. Removed section 39 nay, if desired, be filled in with weld metal after assembly ipon a pipe, but this is not necessary.

The invention may be modified in various respects as will occur to those skilled in the art, and the exclusive use of all modifications as come within the scope of the appended claims is contemplated.

We claim:
1. The method of mounting a protector on a drill pipe having upset ends comprising the steps of forming a metal sleeve with a longitudinal split, heating the sleeve to expand the same, opening the sleeve circumferentialy by elastically deforming the sleeve to separate the edges of said split, applying said opened heated sleeve endwise over one of said upset ends to an intermediate section of said drill pipe, releasing the edges of said split to permit said sleeve to elastically close about the pipe, laying weld metal in said split to cause said sleeve to snugly envelop the pipe, and allowing cooling of said sleeve into a firm shrink fit upon the pipe.

2. The method described in claim 1 including the further step of mechanically clamping said sleeve about the pipe prior to welding thereof.

3. The method described in claim 1 in which the internal circumference of said sleeve in cooled condition substantially equals the external circumference of the pipe.

4. The method described in claim 1 including the further step of sandblasting an area of the pipe surface prior to mounting of said sleeve thereon.

5. The method described in claim 1 in which said sleeve is opened by the insertion of a wedge into said split.

6. The method of mounting a protector on a drill pipe having upset ends and prior to application of threaded tool joint couplings thereto which comprises forming a metal sleeve with a longitudinal split, heating said sleeve, opening said sleeve circumferentially by elastically deforming said sleeve to spread the edges of said split, cleaning an area on the surface of the pipe, applying the opened elastically deformed heated sleeve endwise about the pipe, releasing said edges of said split to allow said opened sleeve to contract upon said cleaned surface area, applying a stringer bead of weld metal at the bottom of said split to cause said sleeve to snugly envelop the pipe, allowing said sleeve to cool into a firm shrink fit on the pipe, and filling the remainder of said split with weld metal.

References Cited

UNITED STATES PATENTS

| | | |
|---|---|---|
| 1,363,160 | 12/1920 | Murray et al. |
| 1,794,278 | 2/1931 | Carney _____ 308—4 |
| 1,947,462 | 2/1934 | Doorbar. |
| 2,259,023 | 10/1941 | Clark _____ 308—4 |
| 2,281,632 | 5/1942 | Steps. |
| 3,047,073 | 7/1962 | Fry. |
| 3,193,918 | 7/1965 | Heldenbrand _____ 29—447 |
| 2,877,062 | 3/1959 | Hall et al. |

CHARLIE T. MOON, Primary Examiner

U.S. Cl. X.R.

29—450, 453, 491; 308—4